Patented Mar. 14, 1939

2,150,565

UNITED STATES PATENT OFFICE 2,150,565

PRODUCTION OF DIAZO PRINTS

Maximilian Paul Schmidt and Oskar Süs, Wiesbaden-Biebrich, Germany, assignors to Kalle & Co. Aktiengesellschaft, Wiesbaden-Biebrich, Germany No Drawing. Application March 23, 1937, Serial No. 132,544. In Germany March 24, 1936

20 Claims. (Cl. 95—6)

The present invention relates to the production of diazo prints and more particularly to a method for the production of such prints, which is characterized by the employment of certain azo components possessing advantageous properties. One object of the invention are therefore new azo components for diazotype purposes. Another object of the invention are light sensitive layers containing the said azo components. A further object are developers particularly liquid developers which contain the said azo components.

Hitherto only comparatively few serviceable compounds were available as azo components for diazotype purposes. The compounds must be stable, fast to light and insensitive to alkali. It is also important that they should be readily soluble in water, while, on the other hand, the dyestuffs produced by the use of the azo components should be as insoluble as possible. The necessary solubility in water has frequently been obtained by the introduction of the sulphonic acid group into the azo component. The employment of sulphonic acids of this kind has, however, the disadvantage that the dyestuffs formed on coupling and consequently also the diazo prints are not very fast to water.

Now, it has been discovered that as azo coupling components substances can be employed which contain an aromatic nucleus carrying a hydroxy group and a methyl group which latter carries a substituent increasing the water-solubility, particularly a basic substituent. The expression "solubility in water" is intended to include also the solubility in acidified water, i. e., the solubility under the formation of salts. Compounds of this kind are obtained, for example, by condensing aromatic or heterocyclic hydroxy compounds which are capable of coupling with diazo compounds, preferably benzene or naphthalene compounds in known manner with aldehydes in the presence of organic secondary bases (see, for example, German Patent 89,979). Preferably one starts in this case from hydroxy compounds which are insoluble or only difficultly soluble in water. Azo components are obtained in this way which form sufficiently easily soluble salts and in spite of that yield prints possessing good fastness to water. The azo components may, if desired, also contain more than one alkyl group substituted in the manner described, for example two groups of this kind. Several hydroxy groups may likewise be present.

According to the invention it is preferable to employ such substances as carry the substituted alkyl group at the position at which, in the absence of the alkyl group, the coupling with the diazo compound would take place, i. e., substances which have the alkyl group in ortho- or para-position to the hydroxy group, or to one of the hydroxy groups as the case may be. Then, during the development the coupling generally takes place with the splitting-off of the substituted alkyl group, at the position of the molecule of the azo group, at which the substituted alkyl group was located the azo components employed according to the invention may also be substituted by further elements or groups, such as alkyl groups, chlorine, carboxyl groups and the like. Inasmuch as it is intended that the azo components without the substituted alkyl groups should be only soluble in water to the smallest possible extent, it is preferable that they should not have any sulpho groups on the nucleus. Such substituents as diminish the stability of the azo components should also not be existent.

The coupling energy of the new azo components is, in general, very small, which is of great advantage for the production of two-component papers capable of remaining stable when stored. For this reason the new azo components can also be employed with particular advantage for the production of photographic printing papers adapted to be developed with water or steam, inasmuch as a small coupling energy is, with layers which, in addition to the diazo and the azo components also carry the alkali necessary for the development in the layer, naturally of particular importance.

Examples of some preferred methods of carrying the invention into practice are set forth below:

(1) A solution of 1.8 grams of the zinc chloride double salt of the diazo compound from 1-amino-4-benzoylamino-2.5-diethoxy benzene, 1.8 cc. of concentrated hydrochloric acid, 2 grams of boric acid, 4 grams of tartaric acid, .21 gram of thiourea and 1.2 grams of 1-methyl-ω-dimethylamino-2-hydroxy naphthalene

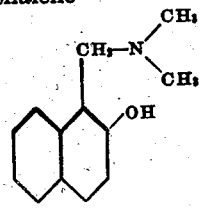

in 72 cc. of water is applied to paper. The development of the paper can be effected by means of ammonia gas or an alkali solution, for example a 4% solution of soda.

Instead of the above-mentioned azo components 4-methyl-ω-piperidyl-1-hydroxy naphthalene can also be employed. This substance is produced by the condensation of 1-naphthyl-carbonic acid ethyl ester with formaldehyde hydrochloric acid to the chlormethyl compound and interchange of the chlorine with the piperidyl residue with simultaneous splitting off of the carbonic acid ethyl ester residue.

(2) 2 grams of the tin tetrachloride double salt of the diazo compound from 1-amino-4-(N-benzyl-N-ethylamino)-benzene, .6 cc. of concentrated hydrochloric acid, .66 gram of boric acid, 1.5 grams of tartaric acid, .07 gram of thiourea and .5 gram of the hydrochloride of a condensation product which is obtained from equimolecular quantities of 2.6-dimethyl-8-hydroxy naphthalene and formaldehyde-dimethylamine, are dissolved in 50 cc. of water. The solution is applied in the usual manner to paper. The prints obtained therewith exhibit, on development with ammonia, a brown-black tone. Instead of the aforementioned azo component the condensation products from 1.4-chlornaphthol or 1.8-chlornaphthol respectively with equimolecular quantities of formaldehyde and dimethylamine may be employed.

(3) A solution of 1.2 grams of the sulphate of the diazo compound from aminodiphenylamine, 1.2 cc. of concentrated hydrochloric acid, 1.32 grams of boric acid, 3 grams of tartaric acid, .2 gram of thiourea and 1 gram of the hydrochloride of a condensation product, which is obtained from equimolecular quantities of 3.5-dihydroxy-benzoic acid and formaldehyde-dimethylamine in 72 cc. of water is applied to paper.

The red-brown tone obtained with this paper on development of the prints undergoes an alteration in shade towards yellow-brown if, instead of the 3.5-dihydroxy-benzoic acid the 2.4-dihydroxy-benzoic acid is employed in the production of the azo component.

(4) 3 grams of the zinc chloride double salt of the diazo compound from 1-amino-4-benzoyl-amino-2.5-diethoxy-benzene, .4 gram of boric acid and 2 grams of the hydrochloride of a condensation product which is obtained from equimolecular quantities of 2.3-hydroxy-naphthoic acid and formaldehyde-dimethylamine, are dissolved in 100 cc. of water. Paper is coated with this solution. With the paper thus prepared prints are obtained which, in the first place, exhibit a brown tone, which after a little time passes over into deep blue-violet.

Instead of the above-named azo component the hydrochloride of a condensation product which is obtained from equimolecular quantities of 3-hydroxydiphenylene oxide and formaldehyde-dimethylamine can be employed, or the condensation product of 2-hydroxy carbazole with formaldehyde and dimethylamine may also be employed.

(5) Paper is coated with a solution of 3 grams of the zinc chloride double salt of the diazo compound from 1-amino-4-benzoylamino-2.5-diethoxy benzene, 1 gram of citric acid and 1 gram of aluminium sulphate in 100 cc. of water. The prints produced by means of a paper prepared in this manner are developed with a solution containing 2 grams of sodium acetate and 2 grams of the hydrochloride of a condensation product which is obtained from 1 molecule of 1.5-dihydroxy naphthalene and 2 molecules of formaldehyde-dimethylamine.

(6) A paper is coated with the sensitizing solution set forth in Example 5. The sensitized layer is rubbed over with an intimate mixture of equal parts of zinc acetate and of the azo component mentioned in Example 5. After exposure and subsequent development with steam, prints having deep blue tones are obtained.

(7) Paper is prepared by treatment with a solution of 3 grams of the zinc chloride double salt of the diazo compound from 1-amino-4-benzoyl-amino-2.5-diethoxy benzene and .5 gram of tartaric acid in 100 cc. of water. The development of the exposed paper is carried out by the use of a 5% aqueous solution of the sodium salt of 1-methyl-ω-(methyl - methylcarboxy - amino)-2-naphthol.

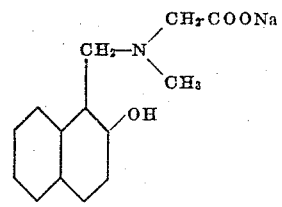

The last-named compound is prepared by the condensation of equimolecular quantities of β-naphthol, formaldehyde and N-methylamino-acetic acid.

(8) The procedure is as in Example 7. Instead of the azo component therein specified, however, the condensation product of β-naphthol with equimolecular quantities of formaldehyde and N-methylaminoethane sulphonic acid is employed.

(9) 1 gram of the diazo compound from p-aminodiethylaniline together with 1 gram of tartaric acid and 1.5 grams of the hydrochloride of the condensation product from 1 molecule of 1.4-dimethyl-2-oxybenzene with equimolecular quantities of formaldehyde and dimethylamine are dissolved in 50 cc. of water. By coating paper with this solution photographic printing material is obtained.

(10) 1 gram of the diazo compound mentioned in Example 9 is dissolved in 50 cc. of water together with 2 grams of tartaric acid and 2 grams of the chlorhydrate of the condensation product of 1 molecule of resorcin with 2 molecules of formaldehyde and 2 molecules of piperidine. The solution is employed for the sensitizing of photographic printing materials.

We claim:

1. Light sensitive diazotype material comprising a diazo compound and 1-methyl-ω-dimethyl-amino-2-hydroxy-naphthalene.

2. Light sensitive diazotype material comprising a diazo compound and the condensation product obtained from equimolecular quantities of 3.5-dihydroxy-benzoic acid and formaldehyde-dimethylamine.

3. Light sensitive diazotype material comprising a diazo compound and the condensation product obtained from equimolecular quantities of 1.4-dimethyl-2-oxybenzene and formaldehyde-dimethylamine.

4. Developer for light sensitive diazotype material comprising an alkaline substance and 1-methyl-ω-dimethyl-amino- 2 -hydroxy-naphthalene.

5. Developer for light sensitive diazotype material comprising an alkaline substance and the condensation product obtained from equimolecular quantities of 3.5-dihydroxy-benzoic acid and formaldehyde-dimethylamine.

6. Developer for light sensitive diazotype material comprising an alkaline substance and the condensation product obtained from equimolecular quantities of 1.4-dimethyl-2-oxybenzene and formaldehyde-dimethylamine.

7. Light-sensitive diazotype material comprising a diazo compound and a coupling component, which contains an aromatic nucleus carrying a hydroxy group and a methyl group, which latter carries a substituent increasing the water-solubility.

8. Light-sensitive diazotype material comprising a diazo compound and a coupling component, which contains an aromatic nucleus carrying a hydroxy group and a methyl group, which latter carries a substituent increasing the water-solubility, the substituted methyl group being located in the molecule in the position in which the coupling takes place with accompanying scission of the substituted methyl group from the nucleus.

9. Light-sensitive diazotype material comprising a diazo compound and a coupling component, which contains an aromatic nucleus carrying a hydroxy group and a methyl group, which latter carries a substituent increasing the water-solubility, the substituted methyl group being located in the molecule in the ortho-position to the hydroxy group.

10. Light-sensitive diazotype material comprising a diazo compound and a coupling component, which contains an aromatic nucleus carrying a hydroxy group and a methyl group, which latter carries a substituent increasing the water-solubility, the substituted methyl group being located in the molecule in the para-position to the hydroxy group.

11. Light-sensitive diazotype material comprising a diazo compound and a coupling component, which contains an aromatic nucleus carrying a hydroxy group and a methyl group, which latter carries a basic substituent.

12. Light-sensitive diazotype material comprising a diazo compound and a coupling component, which contains an aromatic nucleus carrying a hydroxy group and a dimethyl-amino-methyl group, the said dimethyl-amino-methyl group being located in the molecule in the position in which the coupling takes place with accompanying scission of the dimethyl-amino-methyl group from the nucleus.

13. Developer for light-sensitive diazotype material comprising an alkaline substance and a coupling component, which contains an aromatic nucleus carrying a hydroxy group and a methyl group, which latter carries a substituent increasing the water-solubility.

14. Developer for light-sensitive diazotype material comprising an alkaline substance and a coupling component, which contains an aromatic nucleus carrying a hydroxy group and a methyl group, which latter carries a substituent increasing the water-solubility, the substituted methyl group being located in the molecule in the position in which the coupling takes place with accompanying scission of the substituted methyl group from the nucleus.

15. Developer for light-sensitive diazotype material comprising an alkaline substance and a coupling component, which contains an aromatic nucleus carrying a hydroxy group and a methyl group, which latter carries a substituent increasing the water-solubility, the substituted methyl group being located in the molecule in the ortho-position to the hydroxy group.

16. Developer for light-sensitive diazotype material comprising an alkaline substance and a coupling component, which contains an aromatic nucleus carrying a hydroxy group and a methyl group, which latter carries a substituent increasing the water-solubility, the substituted methyl group being located in the molecule in the para-position to the hydroxy group.

17. Developer for light-sensitive diazotype material comprising an alkaline substance and a coupling component, which contains an aromatic nucleus carrying a hydroxy group and a methyl group, which latter carries a basic substituent.

18. Developer for light-sensitive diazotype material comprising an alkaline substance and a coupling component, which contains a hydroxy group and a dimethyl-amino-methyl group, the said dimethyl-amino-methyl group being located in the molecule in the position in which the coupling takes place with accompanying scission of the dimethyl-amino-methyl group from the nucleus.

19. Light-sensitive diazotype material comprising a diazo compound and a coupling component, which contains an aromatic nucleus carrying a hydroxy group and a methyl group, which latter carries an amino group as substituent.

20. Developer for light-sensitive diazotype material comprising an alkaline substance and a coupling component, which contains an aromatic nucleus carrying a hydroxy group and a methyl group, which latter carries an amino group as substituent.

MAXIMILIAN PAUL SCHMIDT.
OSKAR SÜS.